L. BICHLER.
METHOD OF REFRIGERATING LIQUIDS.
APPLICATION FILED JAN. 21, 1911.
1,088,518.
Patented Feb. 24, 1914.
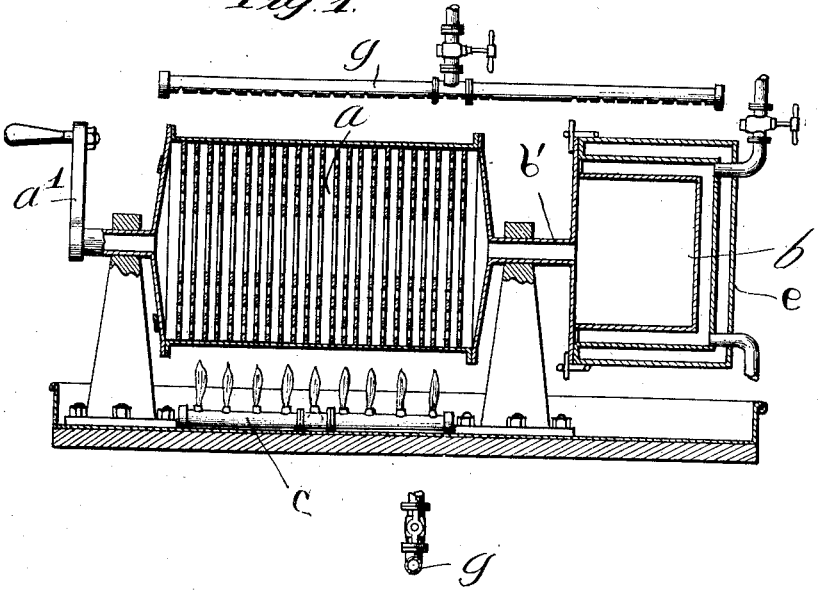
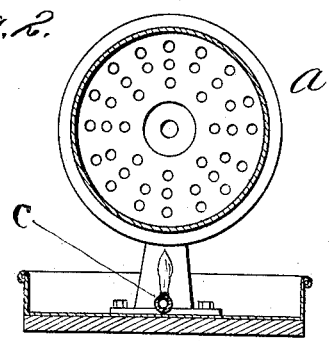
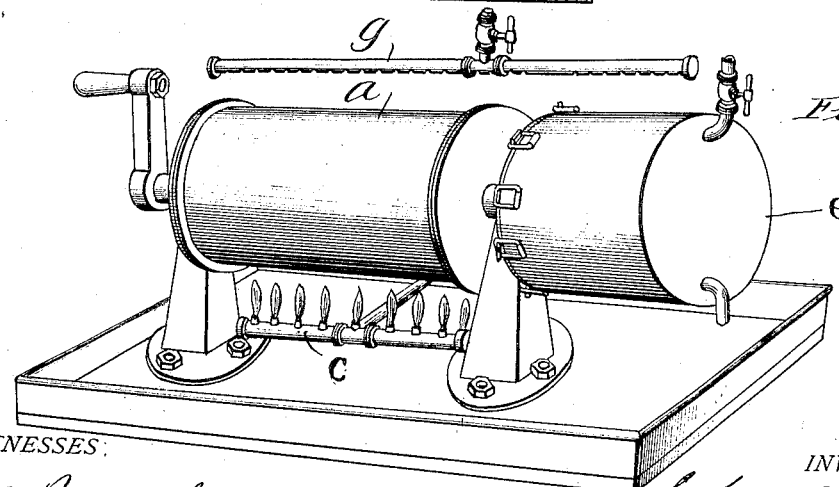
WITNESSES
INVENTOR
Leopold Bichler
By Knight Bros
Attorneys

UNITED STATES PATENT OFFICE.

LEOPOLD BICHLER, OF INNSBRUCK, AUSTRIA-HUNGARY.

METHOD OF REFRIGERATING LIQUIDS.

1,088,518. Specification of Letters Patent. Patented Feb. 24, 1914.

Application filed January 21, 1911. Serial No. 603,990.

*To all whom it may concern:*

Be it known that I, LEOPOLD BICHLER, an apothecary, and a subject of the Emperor of Austria-Hungary, and residing at 12 Leopoldstrasse, in the city of Innsbruck, Tyrol, Empire of Austria-Hungary, have invented new and useful Improvements in Methods of Refrigerating Liquids, of which the following is a specification.

This invention relates to methods of refrigeration in which the operation is carried out in the presence of a vacuum and has for its object rapidly and conveniently to refrigerate liquids and the like or to produce ice. In carrying out such a method of refrigeration it has been usual to produce the necessary cooling effect by causing water to be evaporated from brine such as a solution of magnesium chlorid, such evaporation being promoted by the absorption of the water vapor by a solution of a hygroscopic substance which is subsequently concentrated to drive off the water and employed again as absorbent. In these systems the brine such as a solution of magnesium chlorid constitutes the agent for conveying the cold to the water or other substance to be cooled. According to the present invention I dispense with this agent and employ water and a hygroscope substance alone, the water being alternately evaporated and absorbed by the said substance to produce a cooling effect.

One form of apparatus for carrying out the invention is shown in the accompanying drawing.

According to the invention I use a hermetically closed still $a$ consisting essentially of two inter-communicating vessels $a$ and $b$ within which all air has been exhausted and is excluded permanently. The still proper or first vessel $a$ I first partially fill with a concentrated solution of a water absorbing salt or substance, part of which solution is passed over to the second or refrigerating vessel $b$.

By the application of heat to the still proper or first vessel $a$ the water contained therein is evaporated and the vapor passes into the refrigerating vessel $b$ where it is condensed, the condensation being insured by cooling the refrigerating vessel by a cooling spray $g$, above the vessel $b$. The source of heat $c$ is then withdrawn from the still or first vessel $a$ and the latter containing the salt residue or solution, which is now more concentrated than before is then cooled. The water in the refrigerating vessel reevaporates and thus absorbs heat from its walls, and the vapor passes over to the still or first vessel $a$ and is absorbed by the salt or solution contained therein. In this manner the substance surrounding the refrigerating vessel is refrigerated, the temperature reached being below 0° centigrade.

By the employment of water as the evaporating medium and the continuous and permanent air elimination, it is possible continuously to use the apparatus without recharging.

It will be understood that the small quantity of the solution is passed over into the second vessel for the purpose of maintaining the freezing point of the water distilled below the temperature to which the vessel will be subjected in the second operation.

In carrying the invention into effect water containing in solution a suitable hygroscopic salt or substance such as zinc chlorid or caustic potash preferably at or near the point of saturation is placed in a still or vessel $a$ advantageously of cylindrical form; and a small part of the water and dissolved substance or salt is passed into a second vessel $b$ also advantageously of cylindrical form, which is mounted in communication with the first vessel by a central axially disposed pipe $b'$. The cylindrical vessels thus provided are disposed in the same axial line, and are mounted on trunnions at their respective extremities so as to be capable of rotation by such means as a belt and pulley or by a crank $a'$. It will be understood that the vessels may also be provided of other suitable construction and shape such for example as for the production of ice in sheet form. The apparatus thus constituted is then freed from air and a rarefaction registering at least 4½ millimeters mercury column is produced. The communicating vessels are then permanently closed and the apparatus is ready for use. It will be understood that during the heating period as well as during the refrigerating period, the pressure in the apparatus remains always below that of the atmosphere. Heat is then applied to the first vessel and the water contained therein is evaporated and passes over into the second or refrigerating vessel in the form of vapor, and cooling water is allowed to drip on to the second vessel while it is rotated, so that the water vapor condenses therein. The first vessel is then cooled by having water from the spray $g$ dripped over it, thereby causing the rapid absorption by the salt or solution contained in the vessel of the water vapor on the re-evaporation of the water in the second vessel, which re-evaporation effects the absorption of heat from the walls thereof, by which a temperature below 0° centigrade can be maintained in the second vessel during the operation. It will however be understood that the method can be carried into effect in any conveniently constructed apparatus and that any suitable hygroscopic substance may be employed for the purpose stated.

The second vessel may be constructed of any suitable form and may advantageously be provided with a removable jacket $e$ within which in the second part of the operation ice may be formed on the exterior of the second vessel. This latter may however take any suitable form as may be required for particular purposes. It will be understood that the said jacket may be omitted, and the ice may be produced on the exterior of the second vessel by conducting water or any other substance to be refrigerated upon it.

The apparatus constructed for the carrying out of this process has been shown and described in detail in the U. S. Patent No. 958,683 to Clemens Wagener.

Having thus described my invention, what I claim and desire to secure by Letters Patent of the United States is:

An absorption refrigerating process which consists in maintaining a large body of liquid consisting of an aqueous solution of a hygroscopic salt in a closed vessel and a smaller body of the same liquid in another closed communicating vessel, evaporating the greater part of the water from the first body of liquid and driving the steam into the second-named vessel and condensing it by the application of a cooling medium to the outside of such vessel, then applying a cooling medium to the outside of the first named vessel and thus enabling the hygroscopic medium in the first-named vessel to rapidly re-absorb water vapor from the second-named vessel whereby the solution in said second vessel is cooled by reason of the evaporation, and constantly agitating both bodies of liquid during both the distillation and absorption operations.

LEOPOLD BICHLER.

Witnesses:
ARTHUR V. W. COTTER,
MATHILDE K. HELD.